S. B. STEWARD.
DUMPING-WAGON.

No. 175,385.  Patented March 28, 1876.

WITNESSES:
Francis McArdle
John Goethals

INVENTOR:
S. B. Steward
BY
ATTORNEYS.

UNITED STATES PATENT OFFICE.

SAMUEL B. STEWARD, OF URBANA, OHIO.

IMPROVEMENT IN DUMPING-WAGONS.

Specification forming part of Letters Patent No. 175,385, dated March 28, 1876; application filed February 14, 1876.

*To all whom it may concern:*

Figure 1:
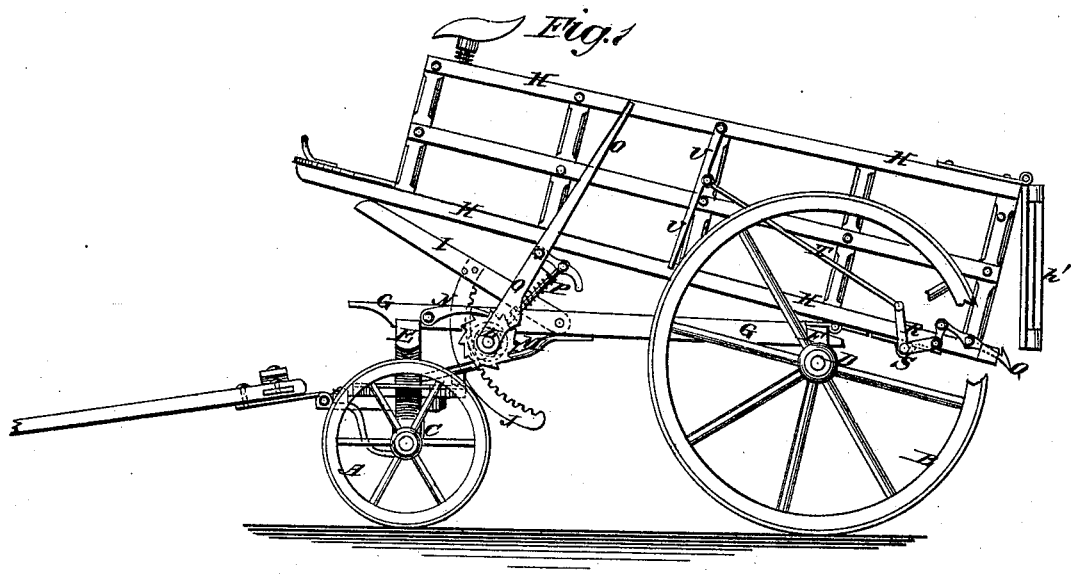
Figure 2:
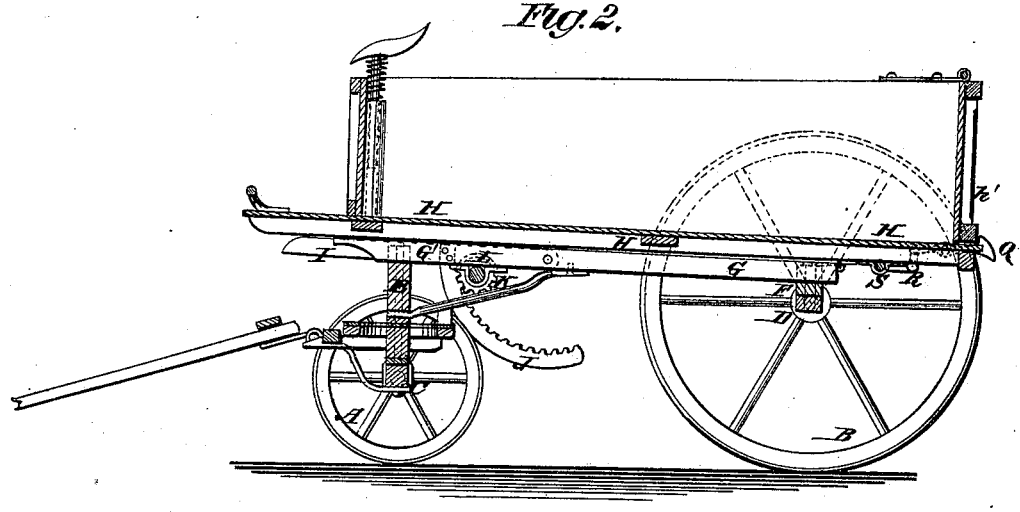

Be it known that I, SAMUEL B. STEWARD, of Urbana, in the county of Champaign and State of Ohio, have invented a new and useful Improvement in Dumping-Wagon, of which the following is a specification:

Figure 1 is a side view of my improved wagon, part being broken away to show the construction. Fig. 2 is a vertical longitudinal section of the same.

Similar letters of reference indicate corresponding parts.

The object of this invention is to furnish an improved wagon, which shall be so constructed that it may be easily and conveniently dumped by one man, and which shall be simple in construction, strong, and durable.

The invention will first be fully described in connection with the drawing, and then pointed out in the claims.

A are the forward wheels. B are the rear wheels. C is the forward axle. D is the rear axle. E is the forward bolster. F is the rear bolster. G are the longitudinal bars upon which the body or box H rests, which body is hinged to the rear bolster F. All of these parts are made in the usual way, except that the central bar G is placed a little at one side of the central line, and the central base-bar of the body or box H a little at the other side of the central line, so that the lever I, pivoted to the side of the central bar G, may be directly beneath the central base-bar of the body or box H. The lever I is pivoted at its rear end to the central bar G, and to it is attached an internally-toothed segment, J, the teeth of which mesh into the teeth of a small gear-wheel, K, attached to the inner end of a shaft, L. The shaft L works in bearings attached to the bars G, and to its outer end is attached a ratchet-wheel, M, upon the teeth of which rests the engaging end of a holding-pawl, N. To the outer end of the shaft L, at the side of the ratchet-wheel M, is attached a lever, O, which is provided with a lever spring-pawl, P, to take hold of the teeth of the said ratchet-wheel M, so that by working the lever O the free forward end of the lever I may be raised, which raises the forward end of the body or box H, causing the loading to slide out at the rear end of said body or box.

h' is the rear end-board of the body or box H, which is hinged at its upper edge to the upper rear corners of the side-boards of said body or box, or to a rod attached to said corners. The lower edge of the end-board h', when swung into place, is caught and held by the two lever-catches Q, which are pivoted to the side-boards of the body or box H, and their forward ends are connected by a link with the rear end of the crank-levers R. The two levers R are attached at their angles to the ends of a rod, S, which works in bearings attached to the base frame of the body or box H. To the forward arm of one of the levers R is pivoted the rear end of a connecting-rod, T, the forward end of which is pivoted to the lever U. The upper end of the lever U is pivoted to the upper part of the side of the box or body H, and its lower end projects into such a position that it may be conveniently reached and operated to release the end-board h', and allow the loading to slide out.

Having thus described my invention, I claim as new and desire to secure by Letters Patent—

1. The combination, with lever I, of the median bar G, and middle base bar of box H, arranged on different sides of the longitudinal central line of wagon, as and for the purpose described.

2. The combination of catches Q Q, one on each side of body, and both connected by angle-levers with the same rock-shaft, for the purpose set forth.

3. The combination of detent N, lever O having spring-pawl and ratchet M, with shaft having pinion K and the arc-rack J, carrying lever I, for the purpose specified.

SAMUEL B. STEWARD.

Witnesses:
THOS. H. B. BEALE,
E. G. WILY.